US012760379B2

(12) United States Patent
Sahajwalla

(10) Patent No.: US 12,760,379 B2
(45) Date of Patent: Oct. 13, 2026

(54) COFFEE AS A CARBON SOURCE IN THE PREPARATION OF IRON AND FERRO-ALLOYS

(71) Applicant: NEWSOUTH INNOVATIONS PTY LIMITED, Sydney (AU)

(72) Inventor: Veena Sahajwalla, Sydney (AU)

(73) Assignee: NEWSOUTH INNOVATIONS PTY LIMITED, Sydney (AU)

( * ) Notice: Subject to any disclaimer, the term of this patent is extended or adjusted under 35 U.S.C. 154(b) by 386 days.

(21) Appl. No.: 18/262,973

(22) PCT Filed: Jan. 27, 2021

(86) PCT No.: PCT/AU2021/050046
§ 371 (c)(1),
(2) Date: Jul. 26, 2023

(87) PCT Pub. No.: WO2022/160002
PCT Pub. Date: Aug. 4, 2022

(65) Prior Publication Data

US 2024/0175100 A1 May 30, 2024

(51) Int. Cl.

| | |
|---|---|
| ***C21B 13/00*** | (2006.01) |
| ***B09B 3/40*** | (2022.01) |
| ***B09B 3/70*** | (2022.01) |
| ***C01B 3/24*** | (2006.01) |
| ***C01B 3/38*** | (2006.01) |
| ***C01B 3/48*** | (2006.01) |
| ***C22C 33/00*** | (2006.01) |
| *B09B 101/70* | (2022.01) |

(52) U.S. Cl.
CPC ............ *C21B 13/0066* (2013.01); *B09B 3/40* (2022.01); *B09B 3/70* (2022.01); *C01B 3/24* (2013.01); *C01B 3/38* (2013.01); *C01B 3/48* (2013.01); *C22C 33/00* (2013.01); *B09B 2101/70* (2022.01); *C01B 2203/0233* (2013.01); *C01B 2203/0266* (2013.01); *C01B 2203/0283* (2013.01)

(58) Field of Classification Search
CPC .................................................. C22B 13/0066
See application file for complete search history.

(56) References Cited

FOREIGN PATENT DOCUMENTS

| | | |
|---|---|---|
| KR | 20170071331 A | 6/2017 |
| KR | 20190073170 A | 6/2019 |
| KR | 20190074075 A | 6/2019 |

OTHER PUBLICATIONS

Smitirupa Biswal et al., 'A novel reforming approach of utilizing spent coffee grounds to produce iron', Resources, Conservation & Recycling, vol. 163, Jul. 28, 2020, pp. 1-8 whole document (Year: 2020).*
Examination Report issued by the Australian Patent Office for related Patent No. 2021104498, dated Oct. 25, 2021, 8 pages.
International Search Report and Written Opinion for International Application No. PCT/AU2021/050046, mailed Apr. 13, 2021; 8 pages.
Smitirupa Biswal et al., 'A novel reforming approach of utilizing spent coffee grounds to produce iron', Resources, Conservation & Recycling, vol. 163, Jul. 28, 2020, pp. 1-8 whole document.

* cited by examiner

*Primary Examiner* — Alexandra M Moore
(74) *Attorney, Agent, or Firm* — Haynes and Boone, LLP

(57) ABSTRACT

The present disclosure broadly relates to processes for preparing iron and ferro-alloys using coffee as a source of carbon.

19 Claims, 11 Drawing Sheets

(b)

COFFEE AS A CARBON SOURCE IN THE PREPARATION OF IRON AND FERRO-ALLOYS

CROSS-REFERENCE TO RELATED APPLICATION

This application is a U.S. National Phase entry of International Application No. PCT/AU2021/050046, filed Jan. 27, 2021, the entire disclosure of which is hereby incorporated herein by reference.

FIELD OF THE DISCLOSURE

The present disclosure broadly relates to processes for preparing iron and ferro-alloys using coffee as a source of carbon.

BACKGROUND OF THE DISCLOSURE

Any discussion of the prior art throughout this specification should in no way be considered as an admission that such prior art is widely known or forms part of the common general knowledge in the field.

Steel is regarded as one of the most important materials in the world, with a global annual output of 1869.9 million tons in 2019. Global steel production increased by 3.4% in 2019 highlighting the high demand for this material as a result of its versatile properties and wide range of applications.

Existing steelmaking technologies require iron, the demand for which is currently met by hot metal (either from blast furnaces or smelting reduction route) and Direct Reduced Iron (DRI)/Hot Briquetted Iron (HBI). Various alternative ironmaking processes have been developed in the past few decades to tackle several problems ranging from the limitation on the availability of high-grade raw materials to the reduction in $CO_2$ emissions. A few of the commercialized technologies include Midrex, ITmk3, Circored, Corex, Finex, HIsmelt, etc. In general, these techniques are fossil fuel dependent as they are either coal-based or natural gas-based processes.

Against this background, the present inventor has developed alternative processes for preparing iron and ferro-alloys using a bio-based, renewable resource.

SUMMARY OF THE DISCLOSURE

In a first aspect there is provided a process for preparing iron comprising:

(a) forming a mixture comprising iron oxide and a carbon source which is, or is obtained from, coffee; and (b) heating the mixture for a period of time sufficient to convert the iron oxide to iron.

In a second aspect there is provided use of a carbon source which is, or is obtained from, coffee for preparing iron from iron oxide.

The coffee may be coffee beans or coffee grounds.

The coffee grounds may be waste or spent coffee grounds.

The iron oxide may have a purity of at least about 80%, or at least about 90%, or at least about 95%, or at least about 98%, or at least about 99%.

The iron oxide may be iron(III) oxide.

The iron(III) oxide may be hematite.

The mixture may be in the form of a pellet.

The mixture may be free of binders and/or flux.

In step (b), the heating may be performed at a temperature between about 800 °C and about 1600 °C, or at a temperature between about 1100 °C and about 1600 °C.

Step (b) may be performed in an inert atmosphere, such as for example an argon atmosphere.

In step (b) the period of time may be between about 5 minutes and about 1 hour, or between about 10 minutes and about 45 minutes.

Prior to step (a), the coffee may be dried.

The coffee may dried at a temperature between about 50 °C and about 100 °C, or at a temperature of about 80 °C.

The carbon source which is obtained from coffee may be coffee that has been subjected to a heat treatment.

The heat treatment may involve heating the coffee under conditions sufficient to increase its carbon content.

The carbon content may be fixed carbon content.

The heat treatment may involve heating the coffee at a temperature between about 100 °C and about 600 °C, or at a temperature between about 200 °C and about 500 °C, or at a temperature of about 400 °C.

The heat treatment may be performed in an inert atmosphere, such as for example an argon atmosphere.

The heat treatment may be carried out for a period of time between about 5 minutes and about 1 hour, or for about 30 minutes.

Prior to step (b), the mixture may be dried.

The mixture may dried at a temperature between about 50 °C and about 100 °C, or at a temperature of about 80 °C.

In an embodiment of the first aspect there is provided a process for preparing iron comprising:

(a) forming a mixture comprising iron oxide and a carbon source obtained from coffee grounds, wherein the carbon source obtained from coffee grounds is obtained by heat treatment of coffee grounds; and (b) heating the mixture for a period of time sufficient to convert the iron oxide to iron.

In the above embodiment the heat treatment may involve heating the coffee grounds under conditions sufficient to increase their carbon content, such as for example, the fixed carbon content.

In the above embodiment, the heat treatment may involve heating the coffee grounds at a temperature between about 200 °C and about 500 °C.

In the above embodiment, in step (b), the heating may be performed at a temperature between about 1000 °C and about 1600 °C.

In the above embodiment, step (b) may be performed in an inert atmosphere, such as for example an argon atmosphere.

In the above embodiment, in step (b) the period of time may be between about 10 minutes and about 45 minutes.

In a third aspect there is provided iron, whenever obtained by the process of the first aspect.

In a fourth aspect there is provided a process for preparing a ferro-alloy, wherein the process comprises the step of addition of a carbon source which is, or is obtained from, coffee.

In a fifth aspect there is provided use of a carbon source which is, or is obtained from, coffee, in the preparation of a ferro-alloy.

The following paragraphs apply to the fourth and fifth aspects.

Addition may be addition to a furnace in which the ferro-alloy is being prepared.

The furnace may be an electric arc furnace.

The ferro-alloy may be steel.

The carbon source may be obtained from coffee.

The carbon source may be obtained from coffee by heating the coffee under conditions sufficient to increase its carbon content.

The carbon content may be fixed carbon content.

Heating may involve heating the coffee at a temperature between about 200 °C and about 500 °C, or at a temperature of about 400 °C.

Heating may be performed in an inert atmosphere, such as for example an argon atmosphere.

Heating may be carried out for a period of time between about 5 minutes and about 1 hour, or for about 30 minutes.

The coffee may be coffee grounds.

In a sixth aspect there is provided a ferro-alloy whenever obtained by the process of the fourth aspect.

In a seventh aspect there is provided a carbon-containing material obtained by heating coffee, the carbon-containing material having an enriched fixed carbon content as compared to the coffee before heating.

The following paragraphs apply to the seventh aspect.

The carbon-containing material may have a fixed carbon content of at least about 40% (w/w), at least about 50% (w/w), at least about 60% (w/w), or at least about 70% (w/w).

Heating may involve heating the coffee at a temperature between about 100 °C and about 600 °C, or at a temperature between about 200 °C and about 500 °C, or at a temperature of about 400 °C.

The coffee may be coffee grounds.

In an eighth aspect there is provided a process for generating hydrogen in situ, the process comprising heating coffee under conditions suitable to liberate hydrogen.

The following paragraphs apply to the eighth aspect.

The process may further comprise using the hydrogen liberated in a reaction.

The coffee may be heated at a temperature between about 800 °C and about 1500 °C, or at a temperature between about 1000 °C and about 1400 °C.

The coffee may be coffee grounds.

Definitions

The following are some definitions that may be helpful in understanding the description of the present disclosure. These are intended as general definitions and should in no way limit the scope of the present disclosure to those terms alone, but are put forth for a better understanding of the following description.

Throughout this specification, unless the context requires otherwise, the word "comprise", or variations such as "comprises" or "comprising", will be understood to imply the inclusion of a stated element, integer or step, or group of elements, integers or steps, but not the exclusion of any other element, integer or step, or group of elements, integers or steps.

The terms "a" and "an" are used herein to refer to one or to more than one (i.e. to at least one) of the grammatical object of the article. By way of example, "an element" means one element or more than one element.

In the context of this specification the term "about" is understood to refer to a range of numbers that a person of skill in the art would consider equivalent to the recited value in the context of achieving the same function or result.

Any numerical range recited herein is intended to include all sub-ranges of the same numerical precision subsumed within the recited range. For example, a range of 1.0 to 5.0 is intended to include all sub-ranges between (and including) the recited minimum value of 1.0 and the recited maximum value of 5.0, that is, having a minimum value equal to or greater than 1.0 and a maximum value equal to or less than 5.0, such as 2.1 to 4.5. Any maximum numerical limitation recited herein is intended to include all lower numerical limitations subsumed therein and any minimum numerical limitation recited herein is intended to include all higher numerical limitations subsumed therein.

BRIEF DESCRIPTION OF THE DRAWINGS

FIG. 3: High temperature/in situ XRD patterns of: (a) iron oxide+T-SCGs; (b) iron oxide+SCGs; (c) iron oxide+MC, and corresponding Reitveld quantification of: (d) iron oxide+TSCGs; (e) iron oxide+SCGs; (f) iron oxide+MC.

In FIGS. 4*a* to 4*d*, the horizontal lines represent the following (starting from the top line in each figure): iron oxide+MC, iron oxide+SCGs, iron oxide+T-SCGs. α is Fe, β is $Fe_xO$, λ is $Fe_3O_4$ and ε is $Fe_2O_3$.

DETAILED DESCRIPTION

Figure 1A:
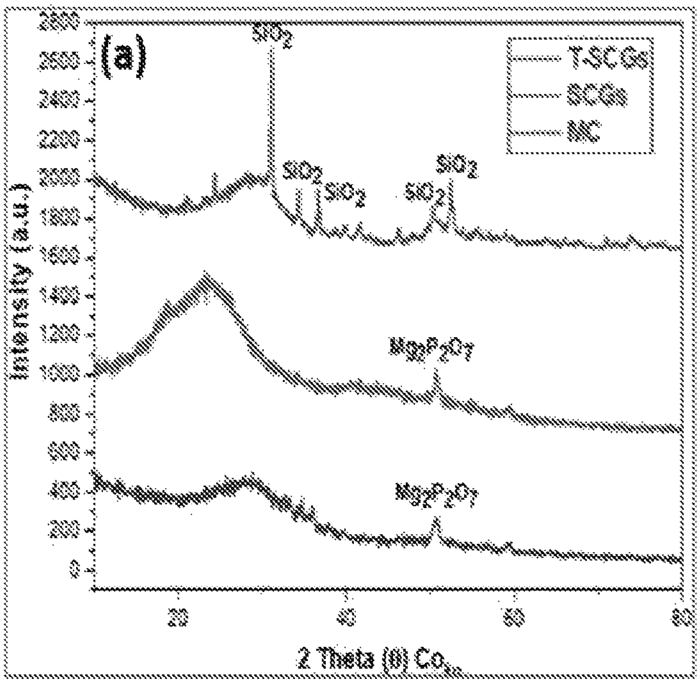
FIG. 1: (a) XRD patterns of all three carbon sources; (b) FTIR spectra of all three carbon sources; (c) Raman spectra of T-SCGs and MC; (d, e, f) TGA and DTG curves of all three carbon sources.
Figure 1B:
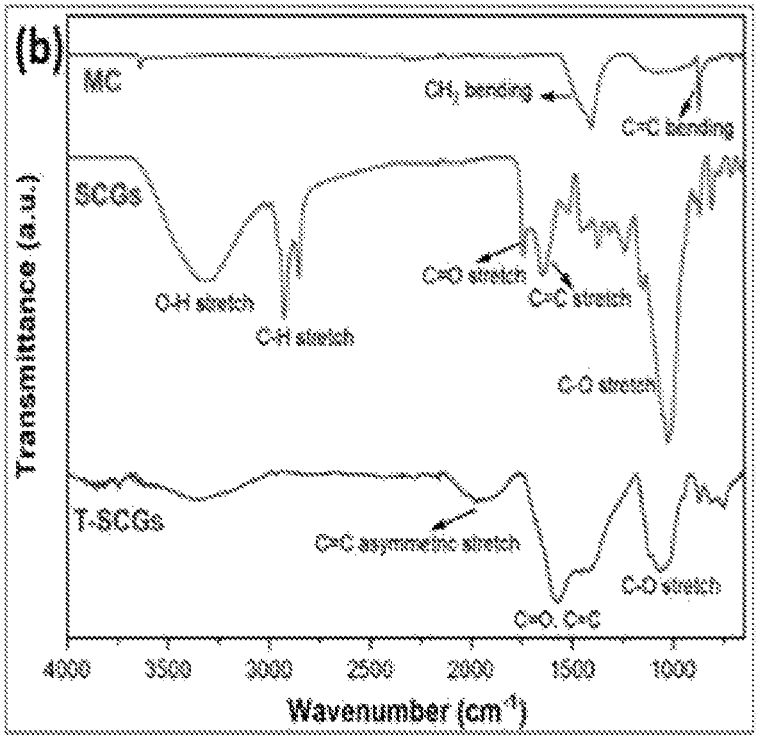
Figure 1C:
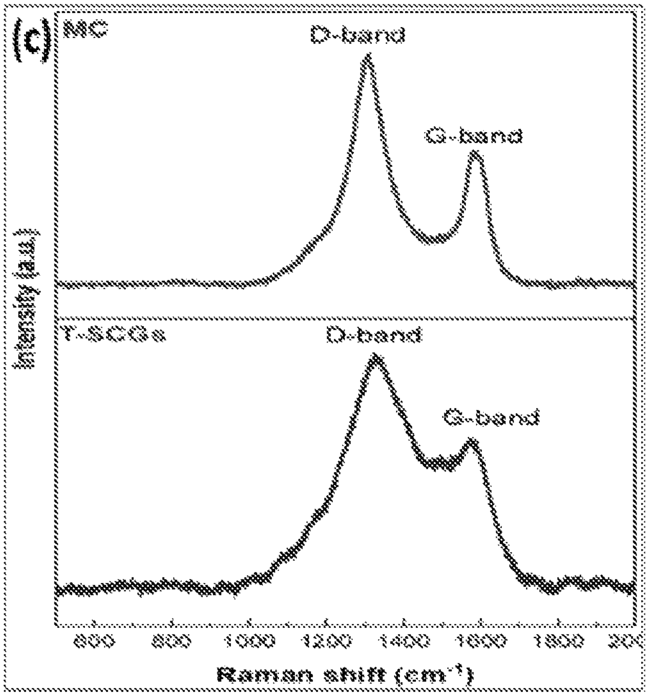
Figure 1D:
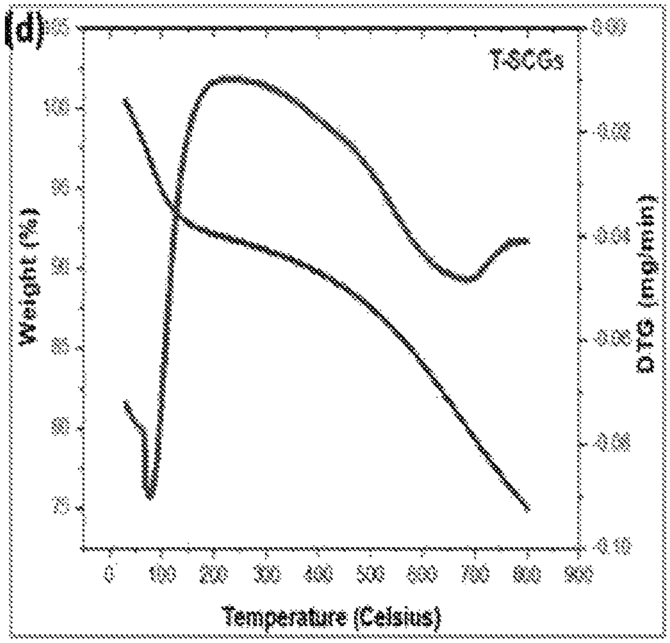
Figure 1E:
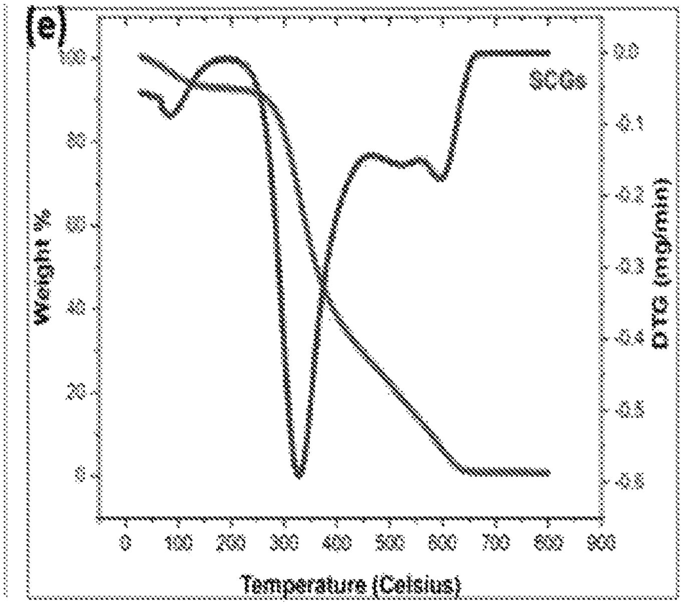
Figure 1F:
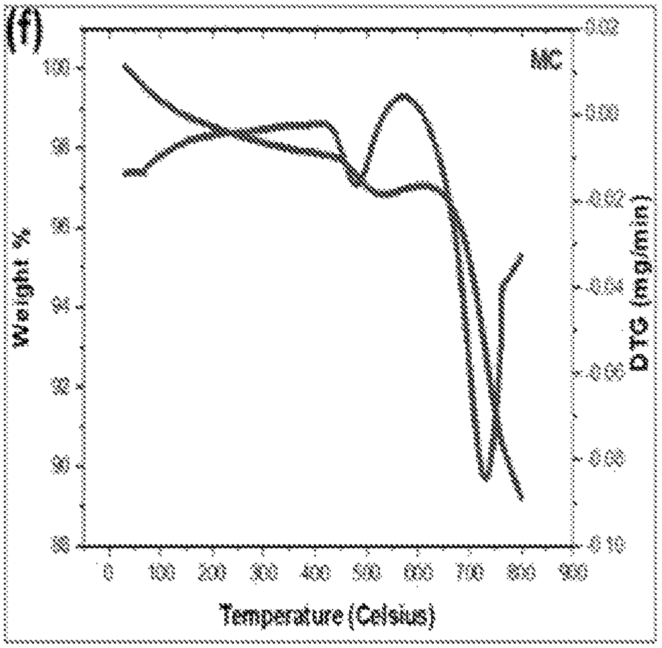

In a first aspect of the disclosure there is provided a process for preparing iron comprising:

(a) forming a mixture comprising iron oxide and a carbon source which is, or is obtained from, coffee; and (b) heating the mixture for a period of time sufficient to convert the iron oxide to iron.

In another aspect of the disclosure there is provided use of a carbon source which is, or is obtained from, coffee for preparing iron from iron oxide.

This process is predicated on the discovery by the inventor that coffee provides a source of carbon which successfully facilitates the reduction of iron oxide to metallic iron. Typically, the coffee is coffee grounds, and in some embodiments is waste or spent coffee grounds. In other embodiments, the coffee may be coffee beans.

The iron oxide may be iron(III) oxide, such as for example hematite. In alternative embodiments, the iron oxide is iron(II) oxide. In other embodiments, the iron oxide may be a mixture of iron(II) oxide and iron(III) oxide.

The iron oxide may have a purity of at least about 80%, or at least about 85%, or at least about 90%, or at least about 95%, or at least about 96%, or at least about 97%, or at least about 98%, or at least about 99%.

In some embodiments, the mixture is free of binders and/or flux. The mixture may be in the form of pellets. The pellets may be spherical, and may have a diameter of about 10 to 13 mm. In other embodiments, the mixture may be in the form of granules.

In step (b), the heating may be performed at a temperature between about 800 °C and about 1600 °C, or at a temperature between about 900 °C and about 1600 °C, or at a temperature between about 1000 °C and about 1600 °C, or at a temperature between about 1100 °C and about 1600 °C, or at a temperature of at least about 500 °C, at least about 600° C., at least about 700 °C, at least about 800 °C, at least about 900 °C, at least about 1000° C., at least about 1100 °C, at least about 1200 °C, at least about 1300 °C, or at least about 1400 °C.

In step (b) the period of time may be between about 5 minutes and about 2 hours, or between about 5 minutes and about 1 hour, or between about 5 minutes and about 45 minutes, or between about 10 minutes and about 45 minutes, or between about 15 minutes and about 45 minutes.

In some embodiments, step (b) is performed in an inert atmosphere, such as for example an argon atmosphere or a nitrogen atmosphere.

Prior to step (a), the coffee may be dried. In other words, the coffee in step (a) may be dried coffee. Drying serves to remove any surface moisture that may be present. In some embodiments, the coffee is dried at a temperature between about 50 °C and about 100 °C, or at a temperature of about 80 °C. Drying may be carried out for a period of time between about 12 hours and about 36 hours, or between about 18 hours and about 30 hours, or between about 20 hours and about 28 hours, or about 24 hours. Typically, drying is carried out in an oven.

The carbon source which is obtained from coffee may be coffee that has been subjected to a heat treatment. The heat treatment serves to produce a carbon-containing material (which may be in the form of a dehydrated solid residue) having a relatively higher carbon content as compared to non-heat treated coffee. The higher carbon content may be a higher fixed carbon content and/or a higher total carbon content.

The heat treatment may involve heating the coffee at a temperature between about 100 °C and about 600 °C, or at a temperature between about 200 °C and about 600 °C, or at a temperature between about 200 °C and about 500 °C, or at a temperature between about 200 °C and about 400 °C, or at a temperature between about 300 °C and about 600° C., or at a temperature between about 350 °C and about 550 °C, or at a temperature between about 400 °C and about 500 °C, or at a temperature between about 350 °C and about 450° C., or at a temperature of about 400 °C. In other embodiments, the heat treatment may involve heating the coffee at a temperature of at least 100 °C, or at least 150 °C, or at least 200 °C, or at least 250 °C, or at least 300 °C, or at least 350 °C or at least 400 °C, or at least 450 °C.

The heat treatment may be carried out for a period of time between about 5 minutes and about 2 hours, or between about 5 minutes and about 1 hour, or between about 10 minutes and about 1 hour, or between about 15 minutes and about 45 minutes, or between about 25 minutes and about 35 minutes, or for about 30 minutes. The heat treatment may be performed in an inert atmosphere, such as for example an argon atmosphere or a nitrogen atmosphere.

In some embodiments, the coffee may be dried prior to being subjected to the heat treatment.

Prior to step (b), the mixture may be dried. In some embodiments, the mixture is dried at a temperature between about 50 °C and about 100 °C, or at a temperature of about 80 °C Drying may be carried out for a period of time between about 30 minutes and about 4 hours, or between about 1 hour and about 3 hours, or between about 1.5 hours and about 2.5 hours, or about 2 hours. Typically, drying is carried out in an oven.

In a further aspect of the disclosure there is provided a process for preparing a ferro-alloy, wherein the process comprises the step of addition of a carbon source which is, or is obtained from, coffee.

The discovery by the inventor that coffee provides a source of carbon which successfully facilitates reduction of iron oxide to metallic iron opens the way for the use of coffee as a carbon source/reductant in the production of ferro-alloys, such as steel, in which iron oxide is required to be reduced to iron. Use of coffee as a reductant serves to reduce the dependency of the ferrous industry on non-renewable carbon sources, such as coal and coke. Globally, coffee grounds are produced daily in huge, ever-growing quantities and therefore represent a plentiful, readily available and renewable carbon source.

A carbon source which is, or is obtained from, coffee may be used in processes for preparing a range of ferro-alloys, such as for example, steel, ferroaluminium, ferroboron, ferrocerium, ferrochromium, ferromagnesium, ferromanganese, ferromolybdenum, ferroniobium, ferronickel, ferrophosphorus, ferrosilicon, ferrosilicon magnesium, ferrotitanium, ferrovanadium and ferrotungsten.

The carbon source which is, or is obtained from, coffee may be as described above in connection with the first aspect.

Typically, addition of the carbon source which is, or is obtained from, coffee is addition to a vessel or reactor, such as a furnace, in which the ferro-alloy is being prepared. Furnaces for producing alloys, such as steel, and their operation will be well known amongst those skilled in the art. In one embodiment, the furnace is an electric arc furnace. In an alternative embodiment the furnace is an induction furnace.

In an embodiment of the fourth aspect there is provided a process for preparing a ferro-alloy in a vessel or reactor, the process comprising the step of addition of a carbon source which is, or is obtained from, coffee to the vessel or reactor. The ferro-alloy may be steel.

The disclosure also provides a carbon-containing material obtained by heating coffee, the carbon-containing material having an enriched fixed carbon content as compared to the coffee before heating.

The carbon-containing material may have a fixed carbon content of at least about 20% (w/w), at least about 25% (w/w), at least about 30% (w/w), at least about 35% (w/w), at least about 40% (w/w), at least about 45% (w/w), at least about 50% (w/w), at least about 55% (w/w), at least about 60% (w/w), at least about 65% (w/w), or at least about 70% (w/w). In alternative embodiments, the carbon-containing material may have a fixed carbon content between about 20% (w/w) and about 80% (w/w), or between about 40% (w/w) and about 80% (w/w), or between about 45% (w/w) and about 75% (w/w), or between about 50% (w/w) and about 70% (w/w), or between about 55% (w/w) and about 70% (w/w), or between about 60% (w/w) and about 70% (w/w), or between about 20% (w/w) and about 70% (w/w), or between about 30% (w/w) and about 70% (w/w).

The heating may involve heating the coffee as described above in connection with the heat treatment in the first aspect. Typically, the coffee is coffee grounds.

The carbon-containing material may find use as a reductant in the manufacture of ferro-alloys, such as steel. The material may serve as a complete or partial replacement for non-renewable carbon sources, such as coke and coal. Alternatively, the material may find use in other applications in which a source of carbon is required.

The inventor has also surprisingly discovered that heat treatment of coffee liberates useful quantities of hydrogen gas. When hydrogen gas is required for an application such as a chemical reaction, it is typically obtained from a remote location. Conveniently, heat treatment of coffee provides for the generation of hydrogen gas in situ. Accordingly, the disclosure further provides a process for generating hydrogen in situ, the process comprising heating coffee under conditions suitable to liberate hydrogen. The coffee may be heated at a temperature between about 800 °C and about 1500 °C, or at a temperature between about 1000 °C and about 1500 °C, or at a temperature between about 1000 °C and about 1400 °C Typically, the coffee is coffee grounds.

EXAMPLES

The present disclosure is further described below by reference to the following non-limiting example.

Preparation of Iron From Iron Oxide Using Dried and Heat-Treated Coffee Grounds

Materials and Experimental Methods

Spent coffee grounds were dried in an electrically heated oven at 80 °C for 24 hours to remove surface moisture. The sample obtained after drying was designated as "SCGs". 50 grams of powdered SCGs were placed in an alumina crucible and heated inside a chamber furnace in an inert atmosphere of argon gas with a flow rate of 3 liters/minute at a temperature of 400 °C for half an hour. The sample obtained after the requisite heat treatment was designated as "T-SCGs". The main purpose of the heat treatment was to produce a dehydrated (i.e. removal of intrinsic moisture) solid residue with a relatively higher carbon content.

Three carbon sources have been used in this example, namely, SCGs, T-SCGs and metallurgical coke (MC). MC was chosen as a conventional carbon source with which to compare SCGs and T-SCGs in terms of their effectiveness as iron oxide reductants. All three carbon sources were subjected to proximate and ultimate analysis. X-Ray Diffraction (PANalytical Empyrean and X'Pert PRO MPD X-Ray Diffraction system) and Fourier Transform Infrared (FTIR) spectroscopy (Perkin-Elmer Spotlight 400 FT-IR) techniques were used for identification of phases and functional groups present in the samples, respectively. Raman spectra of the samples was recorded using a Renishaw inVia 2 Raman Microscope with 785 nm laser over the range of 2000-500 $cm^{-1}$. Thermogravimetric analysis (TGA) (PerkinElmer STA 8000) of the carbon sources was carried out in order to study their degradation behaviour with respect to temperature. All three samples were heated to a temperature of 800 °C at a heating rate of 20 °C/minute in an inert atmosphere of nitrogen with a flow rate of 20 ml/minute.

Three sets of composite pellets were prepared from blends made using hematite ($Fe_2O_3$) (≥99% pure, <5 μm) powder and the carbon sources. No specific binder was used for forming the pellets, except for distilled water. No flux was added because of the high purity of the iron oxide powder. The green pellets were first air dried for 16 hours, followed by drying in an electrically heated oven at a temperature of 80 °C for two hours. A horizontal tube furnace coupled with an IR Gas Analyzer (ABB, AO 2000 series) was employed for isothermal reduction of the pellets at the following temperatures: 1150 °C, 1250 °C, 1400 °C and 1550 °C. Each composite pellet was placed in an alumina crucible which was kept on top of a graphite rod and introduced into the furnace. Initially, the graphite rod was kept in the cold zone of the furnace for 10 minutes to avoid any kind of thermal shock, and after that was gradually pushed into the hot zone. The rod was held in the hot zone for 15 minutes in an inert argon atmosphere (flow rate=1 L/minute). The gas analyzer was used to measure the volume concentrations of the off gasses released from the furnace.

The end products obtained after the reduction were analyzed in a PANalytical Empyrean X-Ray diffraction system fitted with Co tube ($K\alpha_1$:1.789 Å). Reitveld quantification was also performed. The end products (except for the melting temperature of 1550 °C) were also analyzed by inductively coupled plasma optical emission spectrometry (ICP-OES) for determination of total iron (both metallic and oxide form) content.

High temperature XRD was employed to understand the phase transformations of iron oxide in the composite samples in the lower temperature range (500-1100 °C). PANalytical X'Pert PRO MPD fitted with Cu source as anode was used for non-ambient data collection. In order to employ high temperature conditions, specimens were introduced in an Anton Paar HTK-2000 (Pt heat strip) sample stage fitted in the XRD system and PIXcel 2D detector in linear mode was used. X-Ray diffraction patterns were obtained at room temperature for each blend before in situ reduction in the non-ambient stage. All of the individual composite samples were first heated to 500 °C. The X-ray pattern of a sample was measured for every 100 °C, starting from 500 to 1100 °C followed by phase analysis and Reitveld quantification.

Results and Discussion

The results of the proximate and ultimate analysis of all carbon sources are shown in Table 1 below (air dried basis). The total carbon in the SCGs is more than the fixed carbon, which indicates that carbon is mostly present in volatile matter form. In the case of T-SCGs, the fixed carbon content has increased to 63.4% with a decrease of volatile matter to 20.4%. There is a significant decrease in the hydrogen and oxygen content in the T-SCGs which can be attributed to the loss of certain volatile matter. MC shows the highest fixed carbon content of 80.2% with less volatile matter and reasonable ash content.

Table 2 shows the ash analysis of the three carbonaceous materials. The ash is obtained after combustion of the samples at 815 °C which is then analyzed by a Wavelength Dispersive XRF (X-ray Fluorescence) Spectrometer. The composition of the ash will be the same for both SCGs and T-SCGs as the compositional feature of the inorganic content remains the same.

TABLE 1

Proximate and ultimate analysis of the carbon sources (w/w)

| Analysis | SCGs | T-SCGs | MC |
|---|---|---|---|
| Ash (%) | 2.6 | 10.5 | 16.5 |
| Volatile matter (%) | 79.5 | 20.4 | 1.9 |
| Fixed carbon (%) | 16.7 | 63.4 | 80.2 |
| Total carbon (%) | 51.6 | 65.9 | 80.4 |
| Hydrogen (%) | 6.24 | 2.44 | 0.42 |
| Sulfur (%) | 0.16 | 0.27 | 0.44 |

TABLE 1-continued

| Proximate and ultimate analysis of the carbon sources (w/w) | | | |
|---|---|---|---|
| Analysis | SCGs | T-SCGs | MC |
| Nitrogen (%) | 2.43 | 4.48 | 0.58 |
| Oxygen (%) | 35.77 | 10.71 | 0.26 |

TABLE 2

| Ash analysis of the carbon sources | | | | | | | | | | |
|---|---|---|---|---|---|---|---|---|---|---|
| Oxides | $SiO_2$ | $Al_2O_3$ | $Fe_2O_3$ | $Mn_3O_4$ | MgO | CaO | $Na_2O$ | $K_2O$ | $P_2O_5$ | $SO_3$ |
| SCGs/T-SCGs* | 0.70 | 0.31 | 0.31 | 0.28 | 18.30 | 11.95 | 3.56 | 29.35 | 17.23 | 5.49 |
| MC* | 47.23 | 22.25 | 10.31 | 0.09 | 2.96 | 10.55 | 0.83 | 1.26 | 0.50 | 4.02 |

*weight %

FIG. 1 represents the XRD patterns, FTIR spectra, Raman spectra (T-SCGs and MC) and TGA plots of the carbon samples, respectively. The XRD diffractogram (FIG. 1(*a*)) in each case shows a broad amorphous hump for 2θ~20 to 35°, along with some low intensity peaks corresponding to the inorganic matter present in the samples. The broad hump is generally attributed to the amorphous nature of the samples. The inorganic mineral phase identified in the XRD spectra is quite consistent with the XRF ash analysis. The FTIR spectrum (FIG. 1(*b*)) of the SCGs shows the presence of various functional groups in the form of O—H stretch, C—H stretch, C═O stretch, C═C stretch, C—O deformation and C═C bending.

When subjected to thermal transformation at 400 °C, there is a significant loss of volatiles in the form of certain functional groups, especially hydroxyl and aliphatic hydrocarbons (O—H and C—H). This loss of functional groups is evident in the FTIR spectrum of the T-SCGs with decreased transmittance peak intensity, as well as a decrease in hydrogen and oxygen content in the ultimate analysis. Raman spectra acquired in the wavenumber range of 2000-500 $cm^{-1}$ is shown in FIG. 1(*c*) for T-SCGs and MC. Raman spectroscopy is generally undertaken to understand the structure of carbon samples in terms of their disordered structure compared to that of graphitic carbon. From FIG. 1(*c*), two distinct peaks corresponding to D-band (~1340 $cm^{-1}$) and G-band (1580 $cm^{-1}$) can be observed. The greater the intensity and broadness of the D-band peak, the more disordered is the carbon. In general, $I_D/I_G$ ratio is used to obtain the amount of defects induced in the carbonaceous materials. The value of $I_D/I_G$ is slightly more for the MC sample than for the T-SCGs, which indicates the increased disorder in the structure of the MC sample. This high amorphous nature of MC in comparison to the T-SCGs can be confirmed from the high intensity broad hump in the XRD pattern from FIG. 1(*a*).

The relatively high amorphous nature of MC depends on the properties of the parent coal from which it was synthesized. Properties like coal rank and type of macerals present in the coal affect the extent of ordered structure formation in coke. These parent coal properties affect the amount of anisotropic and isotropic carbon in a coke. Moreover, the presence of ash/mineral matter also contributes to the formation of amorphous phases. The ash content is more for MC than for T-SCGs. The nature of TGA and DTG curves for the three carbon samples (shown in Figures. 1(*d, e* and *f*)) indicates different percentages of weight loss when being heated-treated non-isothermally to 800 °C at a rate of 20 °C/min.

There is almost complete weight loss in the case of SCGs, whereas the T-SCGs and MC show a weight loss of about 25% and 11% respectively. The complete weight loss of SCGs can be attributed to the presence of high amounts of volatile matter as mentioned in Table 1. It can also be observed that the thermal decomposition of both the T-SCGs and MC is incomplete up to a temperature of 800 °C, which indicates the need for higher temperatures for further degradation. Higher temperatures could not be applied because of limits on the equipment used. The weight loss observed in T-SCGs may be due to the combination of moisture loss and residual volatile generation from the remaining lignin content of the SCGs, which requires a temperature of more than 500 °C to undergo thermal degradation. The weight loss in MC became more prominent after 700 °C, indicating the occurrence of gasification reactions which may have been initiated by the moisture content of the coke.

Figure 2:
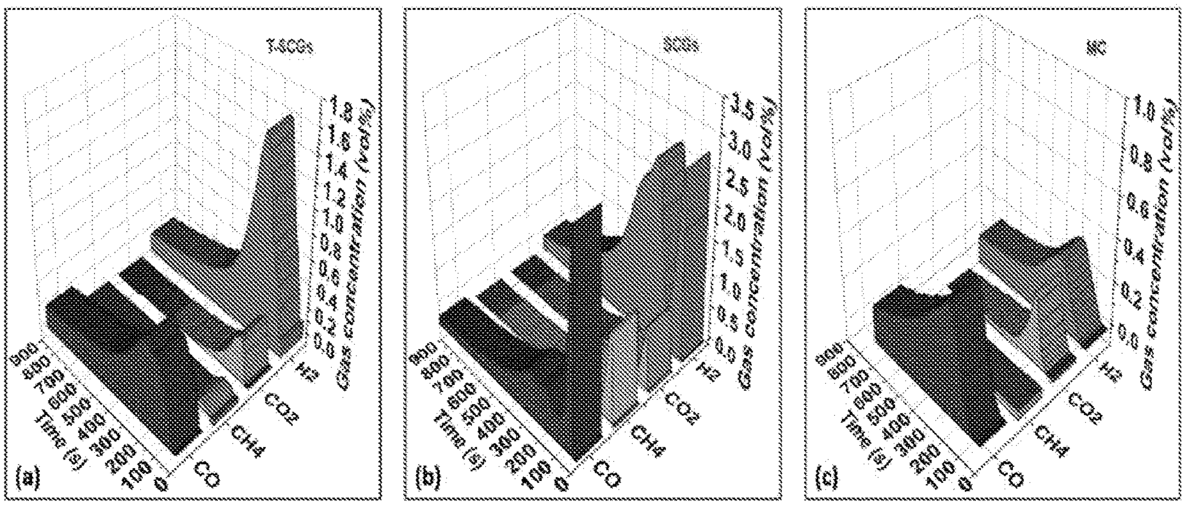
FIG. 2: Off-gas analysis of (a) T-SCGs (b) SCGs (c) MC at 1250 °C.
Figure 3A:
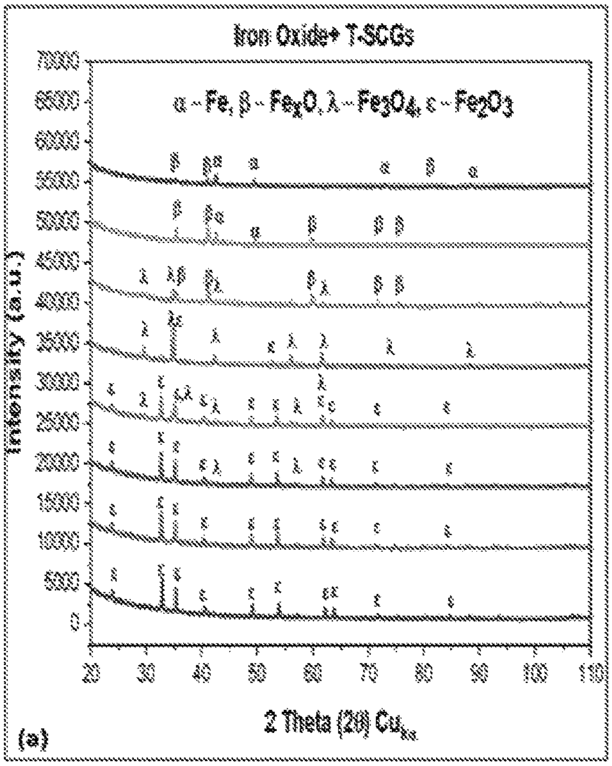
In FIGS. 3*a*, 3*b* and 3*c*, the horizontal lines represent the following temperatures (starting from the top line in each Figure): 1100 °C, 1000 °C, 900 °C, 800 °C, 700 °C, 600 °C, 500 °C and 25 °C.
Figure 3B:
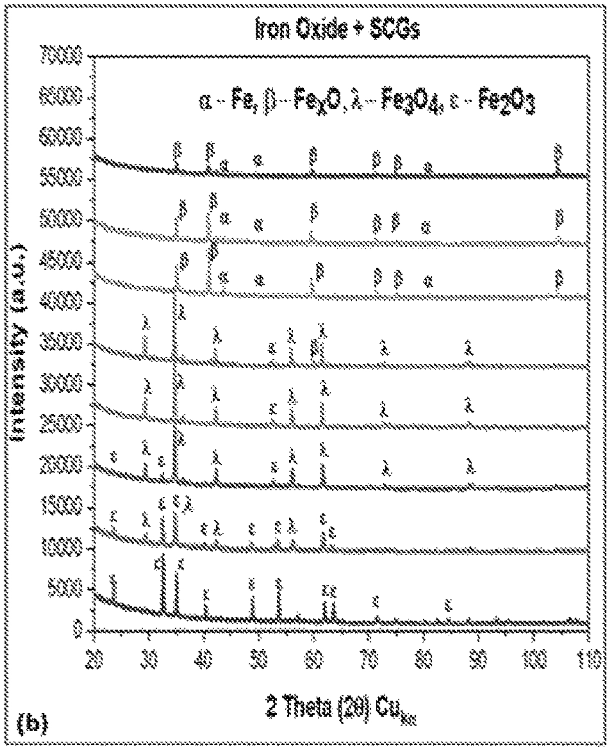
Figure 3C:
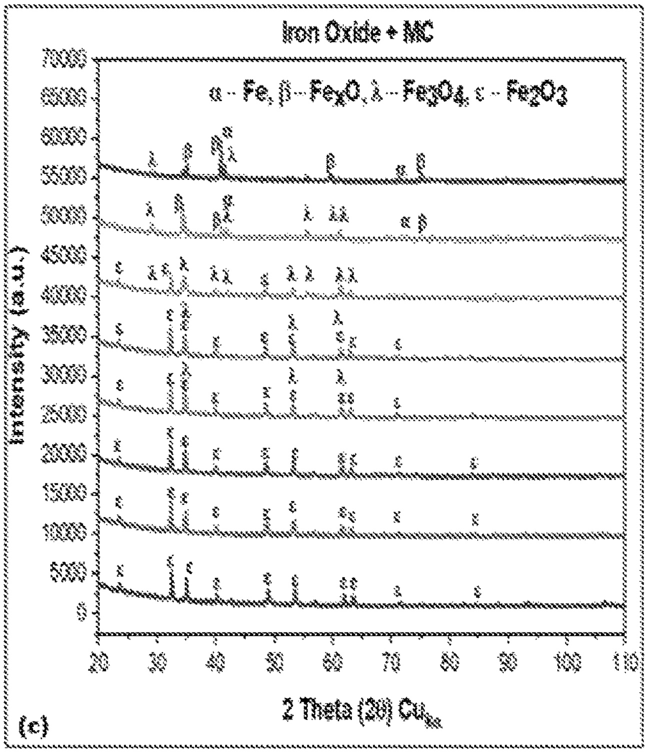
Figure 3D:
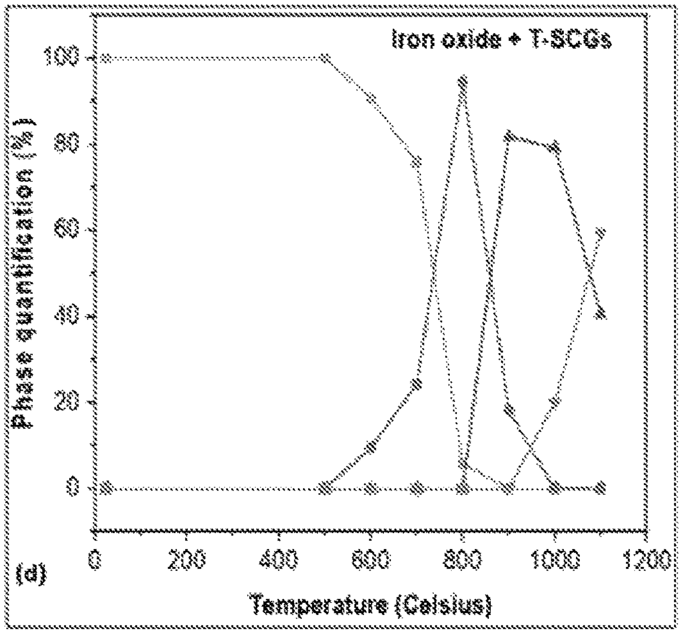
In FIGS. 3*d*, 3*e* and 3*f* represents hematite, represents magnetite, represents wustite, and represents iron.
Figure 3E:
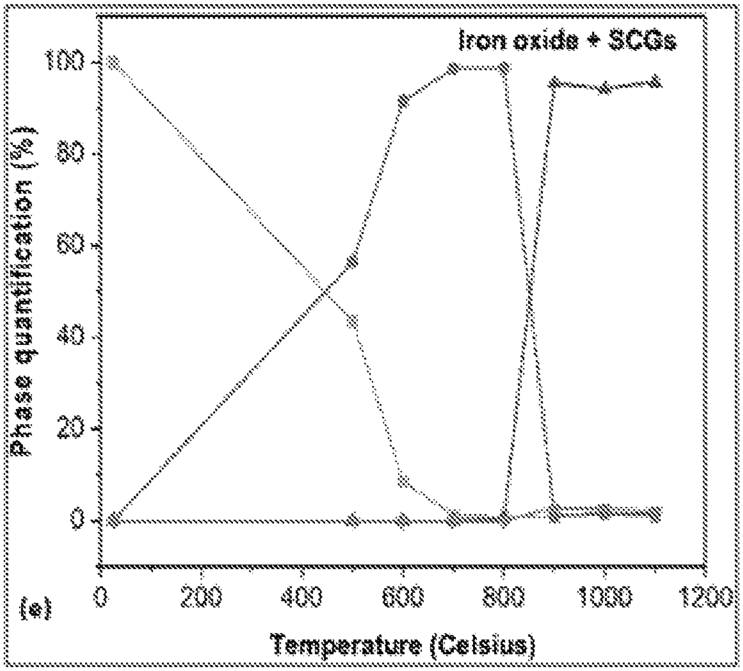
Figure 3F:
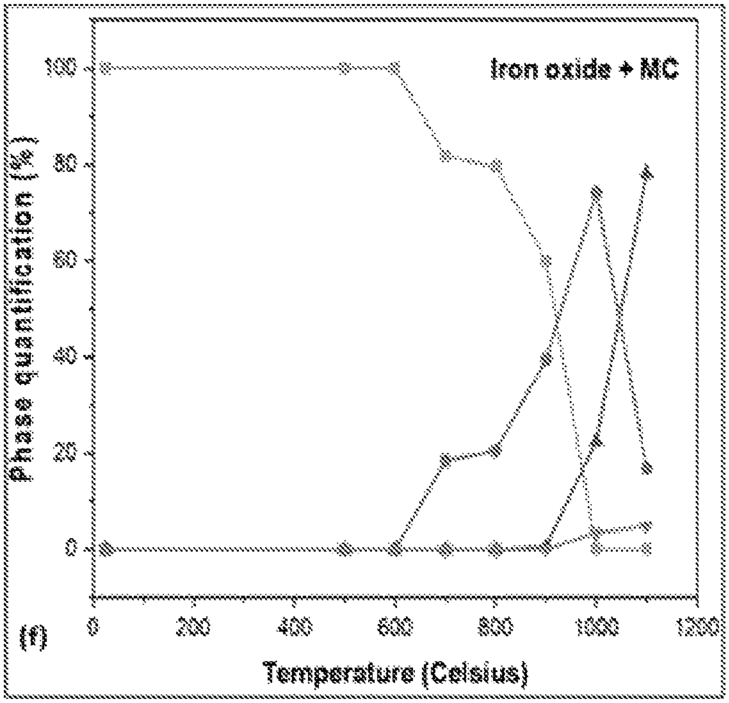

Off-gas analysis of all three carbon samples was carried out at 1250 °C (see FIG. 2) to determine the reactions that give rise to the gasses. From the off-gas analysis of SCGs, it is evident that there are two stages of thermal decomposition, namely, primary decomposition occurring within the first 100 s, followed by secondary decomposition. Taking into account all of the above-mentioned data for SCGs, the primary decomposition may involve release of moisture and volatiles in the form of smaller hydrocarbons like $CH_4$ (degradation of aliphatic groups), CO and $CO_2$ (breaking of C═O and C—O bonds). $CH_4$ decomposes further to $H_2$ and solid carbon, or undergoes a steam reformation reaction.

$$CH_{4(g)} \rightarrow C_{(s)} + H_{2(g)} \quad (1)$$

$$CH_{4(g)} + H_2O_{(g)} \rightarrow CO_{(g)} + 2H_{2(g)} \quad (2)$$

$$CO_{(g)} + H_2O_{(g)} \rightarrow CO_{2(g)} + H_{2(g)} \quad (3)$$

During the secondary decomposition period, the solid carbon that has started to form reacts with the moisture content to form carbon monoxide and hydrogen, and the $CO_2$ gas formed due to breakage of the carbon-oxygen bonds reacts with the solid carbon to form carbon monoxide by a carbon gasification reaction. The amount of carbon monoxide and hydrogen released from the gasification reactions will be low due to the presence of less fixed carbon in the SCGs. Moreover, the degradation of SCGs with time releases more hydrogen content and a slight amount of $CH_4$ signifying the high amount of volatile matter present in the SCGs (see Table 1).

$$C_{(s)} + H_2O_{(g)} \rightarrow CO_{(g)} + H_{2(g)} \quad (4)$$

$$CO_{2(g)} + C_{(s)} \rightarrow 2CO(g) \quad (5)$$

The generation of gasses in the case of T-SCGs during the first 200 seconds is mostly due to the reactions set out in equations (1) and (2) above, along with the breakage of remaining carbon-oxygen bonds (shown in FIG. 1(*b*)). After the period of 200 s, the reaction corresponding to equation (4) became more prominent. For MC, the volume of gasses generated is much less in which the $CO_2$ formed from the thermal degradation reacts with the carbon to form the carbon monoxide gas according to equation (5).

High-temperature/in-situ XRD was employed in order to provide a better understanding of the role of gasses during the reduction process at a relatively low temperature range (500-1100 °C). XRD patterns and Reitveld analysis (obtained from the in situ XRD measurement up to 1100 °C) are shown in FIG. 3. Each of the three composite samples were subjected to various temperatures so as to observe the iron oxide phase transformations. It is noted from FIGS. 3(*a, b* and *c*) that phase transformation did happen in all three cases, with SCGs showing a transformation at lower temperatures as compared to that of T-SCGs and MC. This observation signifies the role of volatiles (of which there are high amounts in SCGs) in carrying out effective reduction at lower temperatures. However, the gradual decrease of volatile matter with increasing time and temperature, and the low availability of reactive carbon slowed the reduction process. As a result, complete transformation of $Fe_xO$ by SCGs did not occur, even though the temperature was increased from 900 °C to 1100 °C. The incomplete transformation of $Fe_xO$ in all three cases indicates a lack of availability of reactive carbon and reducing gasses after a certain period of time, thereby resulting in a poor reduction atmosphere at higher temperatures. From the Reitveld analysis it can be clearly seen that SCGs induce earlier reduction and phase transformation (500 °C), whereas with the MC, the kinetics requires a higher temperature (700 °C). The low-temperature transformation in the case of SCGs can be attributed to the high hydrogen content, which is a kinetically better reductant than the carbon/carbon monoxide.

The volatile matter having a high hydrogen content in the SCGs drives the reduction kinetics quickly at the initial stage, but at a later stage the decrease in hydrogen content and insufficient carbon availability (least fixed carbon) accounts for the relatively lower transformation of iron oxide to iron as compared to the MC. Phase transformation of the T-SCGs started at 600 °C, but it demonstrated the most effective reduction based on the iron content of 59.5% at 1100 °C. The residual volatile matter in the T-SCGs brings about a better initial reduction compared to the MC, and the solid carbon carries further reduction which means the reactivity of carbon in T-SCGs is superior to that of MC (the behaviour of carbon in the T-SCGs will be more inclined towards graphitic behavior, as compared to the carbon in the MC, therefore its reactivity will be better than that of the MC).

Figure 4:
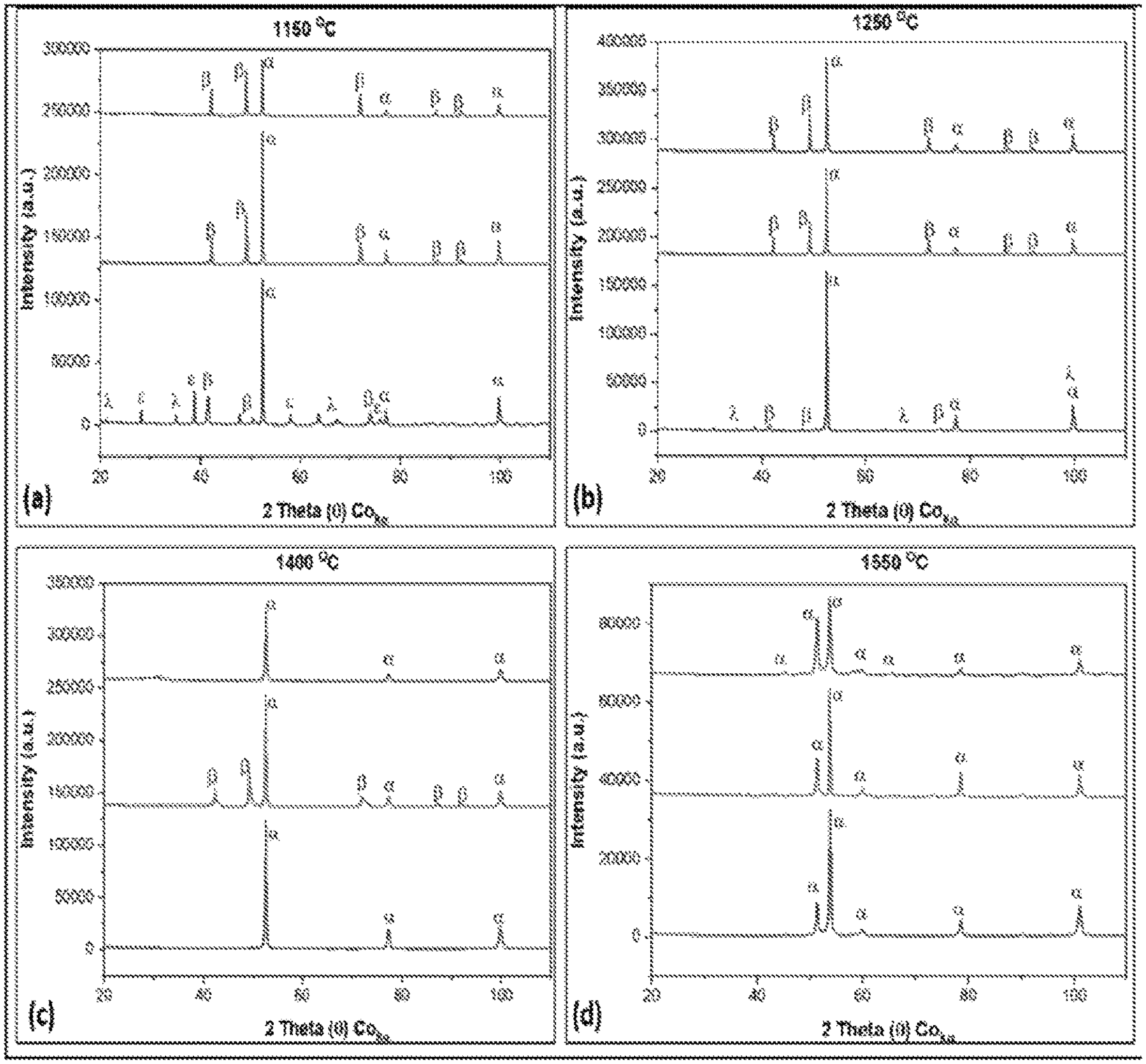
FIG. 4: XRD patterns of iron oxide+T-SCGs; iron oxide+SCGs and iron oxide+MC at temperatures of (a) 1150 °C (b) 1250 °C, (c) 1400 °C and (d) 1550 °C.
Figure 5A:
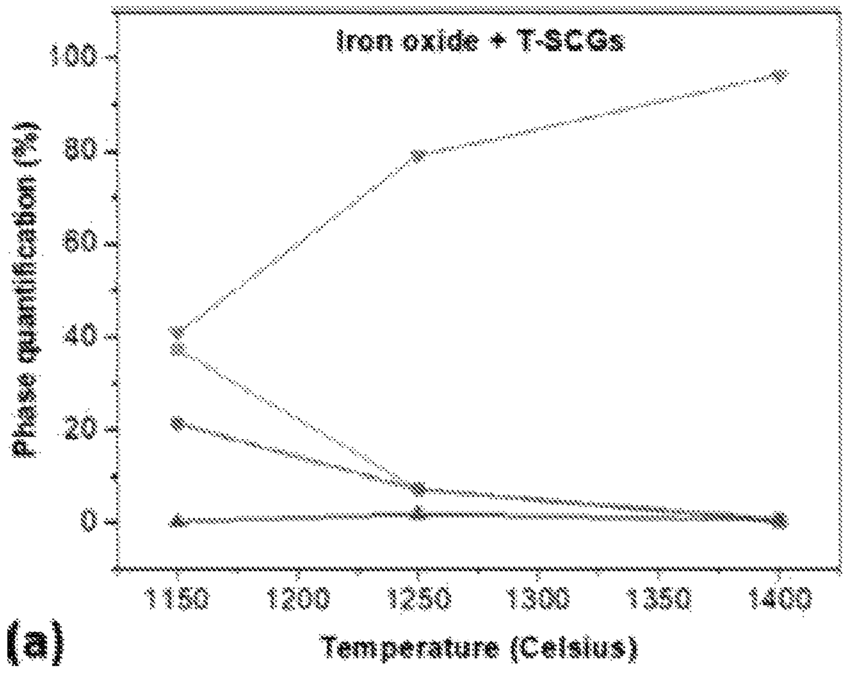
In FIGS. 5*a*, 5*b* and 5*c* represents hematite, represents magnetite, represents wustite, and represents iron.
Figure 5B:
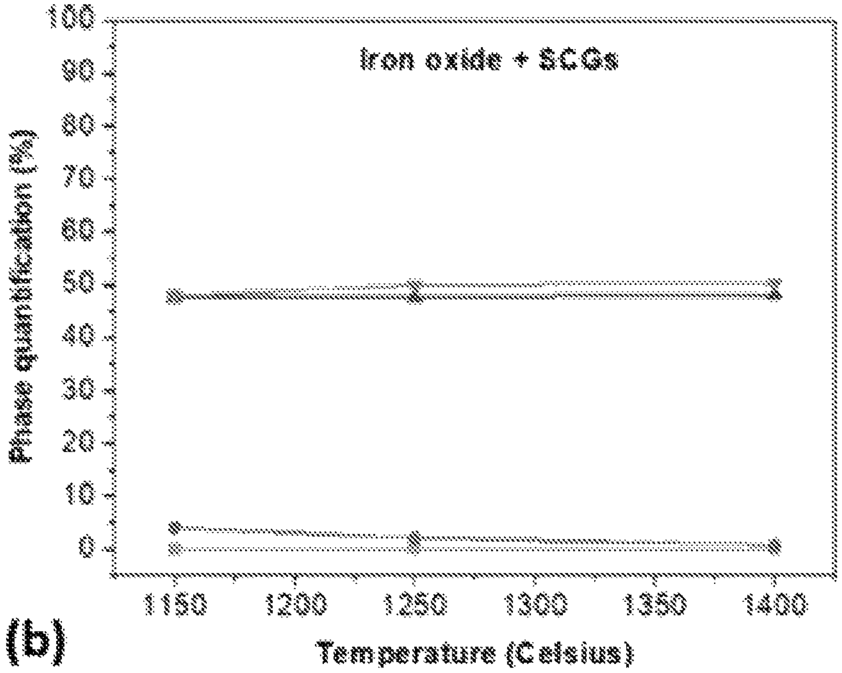
Figure 5C:
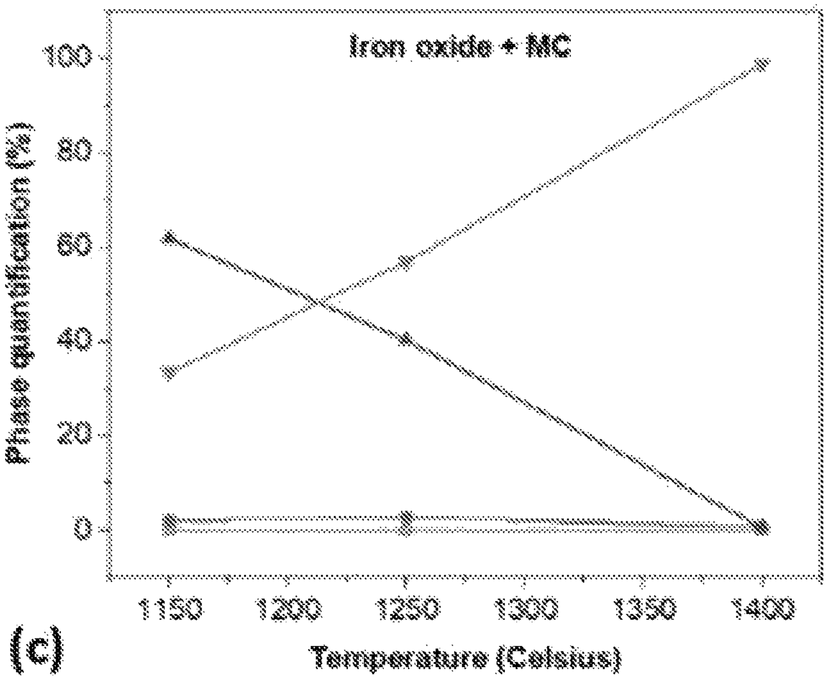
Figure 5D:
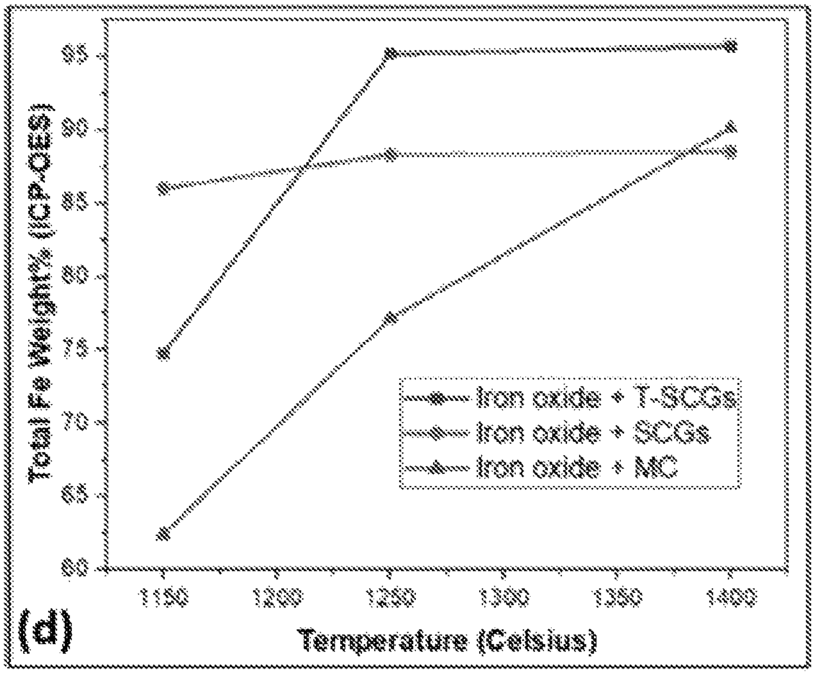
FIG. 5: Reitveld quantification of XRD patterns for (a) iron oxide+T-SCGs; (b) iron oxide+SCGs; (c) iron oxide+MC, at temperatures of 1150 °C, 1250 °C and 1400 °C; (d) total Fe content (ICP-OES data), and (e) degree of reduction data for the composite samples at the same temperatures.
Figure 5E:
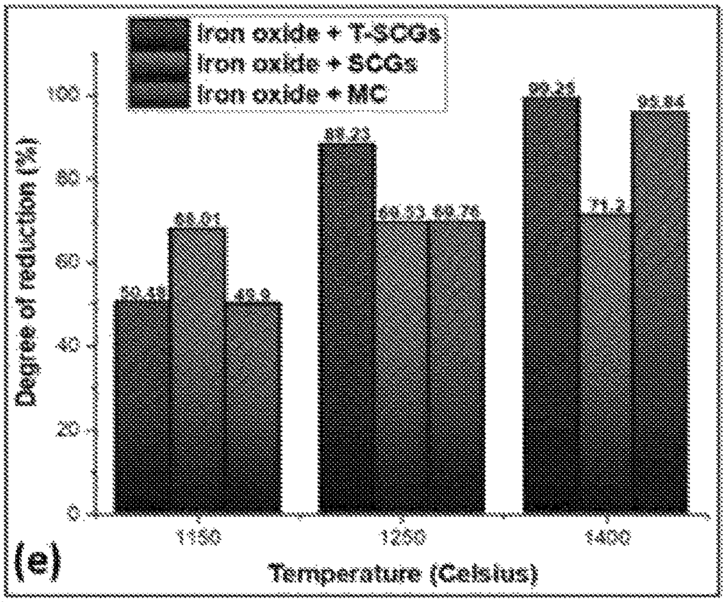

Isothermal reduction experiments were conducted for temperatures above 1100 °C and the end product was characterized by XRD. FIG. 4 represents the X-ray patterns of isothermally treated iron oxide-carbon composite pellets at the following temperatures: 1150° C., 1250 °C, 1400 °C and 1550 °C. It is evident from the diffractograms that iron oxide reduction to metallic iron was feasible at all the above-mentioned temperatures.

Reitveld quantification was also performed for the XRD patterns at all temperatures except 1550 °C (a metal droplet was obtained, therefore it was assumed that no oxide phase was present). Based on the Reitveld quantification data, the degree of reduction for iron oxide was calculated based on the following formula:

Degree of reduction (%)=(oxygen loss/amount of oxygen present in the feed sample)×100

The oxygen loss was calculated with respect to iron oxide ($Fe_2O_3$). The results for the Reitveld quantification, total iron content (ICP-OES) and degree of reduction are shown in FIG. 5.

Figure 6:
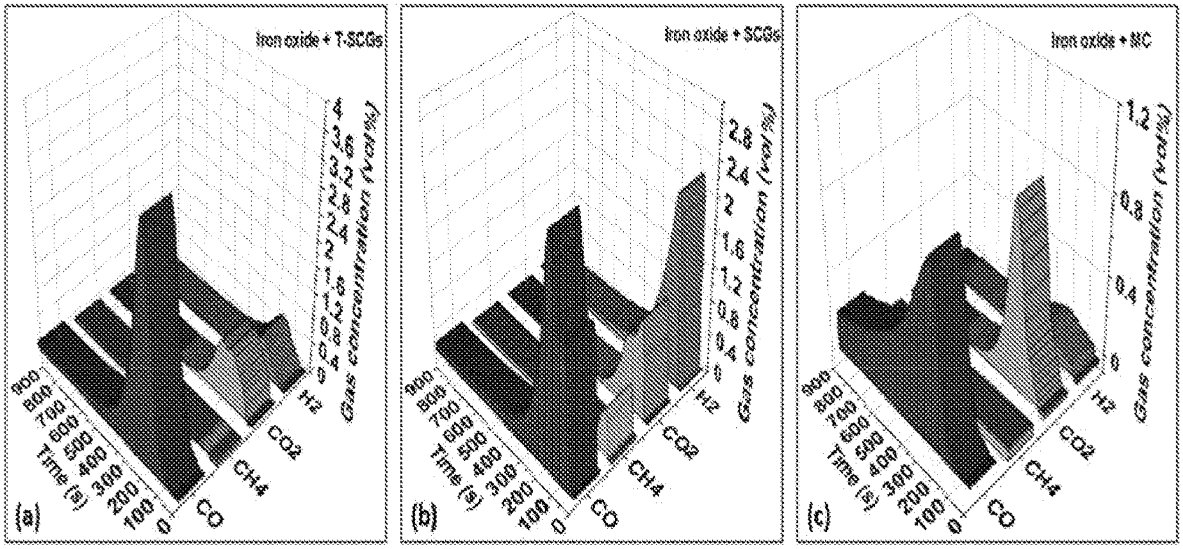
FIG. 6: Off-gas analysis of (a) Iron oxide+T-SCGs (b) Iron oxide+SCGs (c) Iron oxide+MC at 1250 °C.

The weight losses observed in the reduction of pellets in the horizontal tube furnace at different temperatures are shown in Table 3. The off-gas analysis was also carried out for all composite pellets at 1250 °C for 15 minutes in order to provide an insight into the occurrence of possible chemical reactions as shown in FIG. 6.

The hydrogen and carbon monoxide released from the combination of the reactions Equations (1)-(5) must take part in the iron oxide reduction process through the following equations:

$$m\mathrm{Fe}_x\mathrm{O}_y+\mathrm{CO}_{(g)}\rightarrow n\mathrm{Fe}_z\mathrm{O}_w+\mathrm{CO}_{2(g)} \quad (6)$$

$$m\mathrm{Fe}_x\mathrm{O}_y+\mathrm{C}_{(s)}\rightarrow n\mathrm{Fe}_z\mathrm{O}_w+\mathrm{CO}_{(g)} \quad (7)$$

$$m\mathrm{Fe}_x\mathrm{O}_y+\mathrm{H}_{2(g)}\rightarrow n\mathrm{Fe}_z\mathrm{O}_w+\mathrm{H_2O}_{(g)} \quad (8)$$

where x, y=1, 2 or 3 and w, z=1, 3 or 4.

From the XRD spectra, ICP-OES data and Reitveld quantification of the isothermally heat-treated samples (FIGS. 4 and 5), it is observed that SCGs showed a better degree of reduction (about 68% average) at 1150 °C, but there is no further significant change with the increase in temperature. The ICP-OES data shows a trend in higher values in comparison to the Reitveld data of metallic iron because it represents the total iron content (both metallic and oxide form). Both the T-SCGs and the MC followed the increasing trend of degree of reduction with temperature, but the T-SCGs result is better than that of the MC. The degree of reduction results for the isothermal heat treatment are relatively consistent with the observations made from the in situ XRD data, which also showed the superior performance of the T-SCGs as a reductant when the temperature is increased.

It is observed from FIG. 4 that in the case of SCGs, there is incomplete reduction of $Fe_2O_3$ to metallic iron, because there are $Fe_xO$ peaks present. However, when a melting temperature of 1550 °C is applied, only iron peaks are evident in the XRD pattern. Moreover, the weight loss, ICP-OES data and degree of reduction results are quite similar for isothermal reduction of iron oxide-SCGs at different temperatures, which can be observed from Table 3 and FIGS. 5(*d* and *e*). These suggest that the volatiles did carry out a faster reduction reaction at the initial stage, which in turn should have released a lot of gasses (in accordance with Equations (2), (3) and (6) to (8).

TABLE 3

Weight loss % observed during reduction of a composite pellet in horizontal tube furnace

| Temperature (° C.) | Iron oxide + SCGs Weight loss (%) | Iron oxide + T-SCGs Weight loss (%) | Iron oxide + MC Weight loss (%) |
|---|---|---|---|
| 1150 | 43.3 | 33.77 | 17.45 |
| 1250 | 43.37 | 41.45 | 26.81 |
| 1400 | 45 | 43.9 | 35.64 |
| 1550 | 44.7 | 45.16 | 36.38 |

The use of SCGs as a reductant generates huge amounts of gasses, which in turn increases the porosity of the pellet, as well as increasing the solid-gas interfacial reaction surface area. The increase in porosity of the pellet due to release of volatiles is so vigorous that it creates tiny cracks. Through these cracks, the gasses (which take part in the reduction process), escape easily to the atmosphere which is evident from the off-gas analysis shown in FIG. 6(*b*). Therefore, the primary decomposition generates such a high amount of gasses that reduction is effected quickly resulting in a loss of these gasses during the first 100 s. Kinetically, hydrogen is a faster reductant than carbon or carbon monoxide. At isothermal reduction, hydrogen may start the reduction process very quickly, but when there is gradual increase in the CO and $CO_2$ concentrations, these gasses hinder the accessibility of reaction sites by hydrogen and decrease the reduction rate. However, when the secondary decomposition phase of the SCGs starts, hydrogen volume percentage gradually reduces and volume generation of CO increases, CO then taking part in the reduction reaction.

The reduction in the later stage would have been affected because of the low fixed carbon content in the SCGs (see Table 1), and no proper entrapment of the gas mix generated during the initial stage. Therefore, due to the presence of insufficient reducing gas mixture in the later stage, the further solid-state reduction of $Fe_xO$ to Fe was affected. On exposure to a melting temperature of 1550 °C, the contact surface area increases in the case of liquid melt (composite sample) and the gas mixture has more access to the reaction sites, and the dissolution of solid carbon in the liquid melt aids in further reduction. Therefore, there is no observance of any oxide peaks in the cases of the different composite pellets when they were isothermally heat-treated at 1550 °C.

The solid-state reduction mechanism is quite different for iron oxide+T-SCGs composite pellets. The reaction kinetics are slow as oxide peaks like hematite, magnetite and $Fe_xO$ are evident at 1150 °C. However, at 1150 °C the degree of reduction is quite similar to that of the MC, but coke does not show any presence of hematite in the reduced sample. This could be a case of the diffusion of the reducing gas mixture through the product layer of the metallic iron formed. When the reducing gasses are generated inside the pellet, they are being trapped between the layers of metallic iron and wustite. As a result, the wustite phase got transformed mostly to the metallic iron phase, which is evident from their low concentrations in FIG. 5(*a*).

As the temperature is increased, the reaction mechanism is further strengthened, as the main reduction reactions in the solid-state iron oxide reduction are endothermic and the diffusion of reducing gasses through different phases becomes more effective. In the case of T-SCGs, the presence of less volatile matter aids in better accessibility to reaction sites by hydrogen, and then in a later stage CO takes part in the reduction reaction formed by the gasification process. It can be concluded that the hydrogen present in the T-SCGs takes part in an effective reduction environment as there is no surplus gas mixture causing the loss of accessibility to reaction sites. Later, the behaviour of solid carbon (similar to MC) plays an integral role in enhancing the reduction mechanism. T-SCGs show better reduction than SCGs and MC, although there is a possibility that if there is proper entrapment of the gas mixture in the case of SCGs, the results could be comparable to that of the T-SCGs.

The above results show that SCGs can be effectively utilized as an alternative carbon source to recover iron values, thereby decreasing the dependency of ferrous industries on conventional, non-renewable carbon materials. Surprisingly, both SCGs and T-SCGs are more effective at reducing iron oxide than MC. SCGs initiate the reduction process quite early, and show better performance than MC at lower temperatures (i.e. 500-900 °C). T-SCGs show better results in iron recovery than MC at higher temperatures. The degree of reduction of iron oxide with T-SCGs was always higher than that of MC in the temperature range of 1150-1400 °C. When employed in the ferrous industry, SCGs (being a daily generated waste material) as a carbon resource provide for a reduction in greenhouse gas emissions, energy consumption and mining costs.

Those skilled in the art will appreciate that the disclosure described herein is susceptible to variations and modifications other than those specifically described. It is to be understood that the disclosure includes all such variations and modifications. The disclosure also includes all of the steps, features, compositions and compounds referred to or indicated in this specification, individually or collectively, and any and all combinations of an two or more of said steps, features, compositions and compounds.

The invention claimed is:

1. A process for preparing iron comprising:

(a) forming a mixture comprising iron oxide and a carbon source which is, or is obtained from, coffee; and (b) heating the mixture for a period of time sufficient to convert the iron oxide to iron;

wherein in step (b), the heating is performed at a temperature between about 1100 °C and about 1600 °C.

2. The process of claim 1, wherein step (b) is performed in an inert atmosphere.

3. The process of claim 1, wherein in step (b) the period of time is between about 5 minutes and about 1 hour.

4. The process of claim 1, wherein prior to step (a), the coffee is dried.

5. The process of claim 1, wherein the carbon source which is obtained from coffee is coffee that has been subjected to a heat treatment.

6. The process of claim 5, wherein the heat treatment comprises heating the coffee under conditions sufficient to increase its carbon content.

7. The process of claim 6, wherein the carbon content is fixed carbon content.

8. The process of claim 5, wherein the heat treatment involves heating the coffee at a temperature between about 200 °C and about 500 °C.

9. The process of claim 5, wherein the heat treatment is performed in an inert atmosphere.

10. The process of claim 5, wherein the heat treatment is carried out for a period of time between about 5 minutes and about 1 hour.

11. The process of claim 1, comprising:

(a) forming a mixture comprising iron oxide and a carbon source obtained from coffee grounds, wherein the carbon source obtained from coffee grounds is obtained by heat treatment of coffee grounds; and (b) heating the mixture for a period of time sufficient to convert the iron oxide to iron.

12. The process of claim 11, wherein the heat treatment comprises heating the coffee grounds under conditions sufficient to increase their carbon content.

13. The process of claim 12, wherein the carbon content is fixed carbon content.

14. The process of claim 11, wherein the heat treatment involves heating the coffee grounds at a temperature between about 200 °C and about 500 °C.

15. A process for preparing a ferro-alloy, comprising:

(a) forming a mixture comprising iron oxide and a carbon source which is obtained from coffee; and (b) heating the mixture for a period of time sufficient to convert the iron oxide to iron, wherein in step (b) the heating is performed at a temperature between about 1100 °C and about 1600 °C; and wherein the coffee has been subjected to a heat treatment comprising by heating the coffee under conditions sufficient to increase its carbon content.

16. The process of claim 15, wherein the carbon content is fixed carbon content.

17. The process of claim 15, wherein the heat treatment involves heating comprises heating the coffee at a temperature between about 200 °C and about 500 °C.

18. The process of claim 15, wherein the heat treatment and/or the heating in step (b) is performed in an inert atmosphere.

19. The process of claim 15, wherein the heat treatment is carried out for a period of time between about 5 minutes and about 1 hour.

* * * * *